US008214653B1

(12) United States Patent
Marr et al.

(10) Patent No.: US 8,214,653 B1
(45) Date of Patent: Jul. 3, 2012

(54) SECURED FIRMWARE UPDATES

(75) Inventors: Michael David Marr, Monroe, WA (US); Matthew T. Corddry, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 425 days.

(21) Appl. No.: 12/554,736

(22) Filed: Sep. 4, 2009

(51) Int. Cl.
*G06F 21/00* (2006.01)

(52) U.S. Cl. ........ 713/189; 713/150; 713/167; 380/286; 726/26

(58) Field of Classification Search ........................ None
See application file for complete search history.

(56) References Cited

U.S. PATENT DOCUMENTS

| | | | |
|---|---|---|---|
| 4,939,382 A | 7/1990 | Gruodis | |
| 5,530,753 A * | 6/1996 | Easter et al. | 713/191 |
| 5,799,086 A * | 8/1998 | Sudia | 705/76 |
| 6,385,727 B1 * | 5/2002 | Cassagnol et al. | 713/193 |
| 6,615,349 B1 * | 9/2003 | Hair | 713/165 |
| 6,957,328 B2 | 10/2005 | Goodman et al. | |
| 7,305,711 B2 * | 12/2007 | Ellison et al. | 726/29 |
| 7,350,083 B2 | 3/2008 | Wells et al. | |
| 7,796,646 B2 | 9/2010 | Das et al. | |
| 2002/0150243 A1 * | 10/2002 | Craft et al. | 380/201 |
| 2002/0157011 A1 * | 10/2002 | Thomas III | 713/193 |
| 2003/0023966 A1 | 1/2003 | Shimizu et al. | |
| 2003/0058860 A1 | 3/2003 | Kunze et al. | |
| 2003/0074657 A1 | 4/2003 | Bramley, Jr. | |
| 2003/0115471 A1 * | 6/2003 | Skeba | 713/180 |
| 2003/0185207 A1 | 10/2003 | Nakahara | |
| 2004/0025036 A1 * | 2/2004 | Balard et al. | 713/189 |
| 2004/0117640 A1 | 6/2004 | Chu et al. | |
| 2004/0128549 A1 | 7/2004 | Poisner | |
| 2004/0162915 A1 | 8/2004 | Caronni et al. | |
| 2004/0249974 A1 | 12/2004 | Alkhatib et al. | |
| 2005/0131997 A1 | 6/2005 | Lewis et al. | |
| 2005/0207421 A1 | 9/2005 | Suzuki | |
| 2005/0265351 A1 | 12/2005 | Smith et al. | |
| 2006/0015751 A1 | 1/2006 | Brickell et al. | |
| 2006/0026301 A1 | 2/2006 | Maeda et al. | |
| 2006/0080522 A1 | 4/2006 | Button et al. | |
| 2006/0107071 A1 | 5/2006 | Girish et al. | |
| 2006/0143473 A1 | 6/2006 | Kumar | |
| 2006/0174109 A1 * | 8/2006 | Flynn | 713/164 |
| 2006/0182103 A1 | 8/2006 | Martini et al. | |
| 2008/0083036 A1 * | 4/2008 | Ozzie et al. | 726/27 |
| 2008/0104701 A1 | 5/2008 | Peacock et al. | |
| 2009/0300149 A1 | 12/2009 | Ferris et al. | |
| 2010/0023777 A1 * | 1/2010 | Prevost et al. | 713/180 |
| 2010/0070623 A1 | 3/2010 | Sawada | |
| 2010/0100733 A1 | 4/2010 | Jaber et al. | |
| 2010/0266132 A1 * | 10/2010 | Bablani et al. | 380/286 |
| 2010/0293289 A1 | 11/2010 | Hsu et al. | |

\* cited by examiner

*Primary Examiner* — Ponnoreay Pich
(74) *Attorney, Agent, or Firm* — Novak Druce + Quigg LLP

(57) ABSTRACT

When providing a user with native access to at least a portion of device hardware, the user can be prevented from modifying firmware and other configuration information by controlling the mechanisms used to update that information. In some embodiments, an asymmetric keying approach can be used to encrypt or sign the firmware. In other cases access can be controlled by enabling firmware updates only through a channel or port that is not exposed to the customer, or by mapping only those portions of the hardware that are to be accessible to the user. In other embodiments, the user can be prevented from modifying firmware by only provisioning the user on a machine after an initial mutability period wherein firmware can be modified, such that the user never has access to a device when firmware can be updated. Combinations and variations of the above also can be used.

24 Claims, 8 Drawing Sheets

SECURED FIRMWARE UPDATES

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific resources. Such access comes with risks for providers of those resources, however, as in a cloud or other shared environment there typically will be other users sharing those resources at various times, and a modification of the resource by one user can potentially be detrimental to subsequent users. In order to ensure that one user does not alter the hardware, firmware, or software in an inappropriate way that will affect other users, such as by altering firmware to inject malicious code, it can be necessary to re-image the resource after each user. Such an approach might be acceptable in situations where users have dedicated access to a resource for an extended period of time, but in a cloud or similar environment where the user of a resource could change several times over a short period of time, such an approach can be too expensive and resource intensive.

BRIEF DESCRIPTION OF THE DRAWINGS

Various embodiments in accordance with the present disclosure will be described with reference to the drawings, in which.

DETAILED DESCRIPTION

Figure 1:
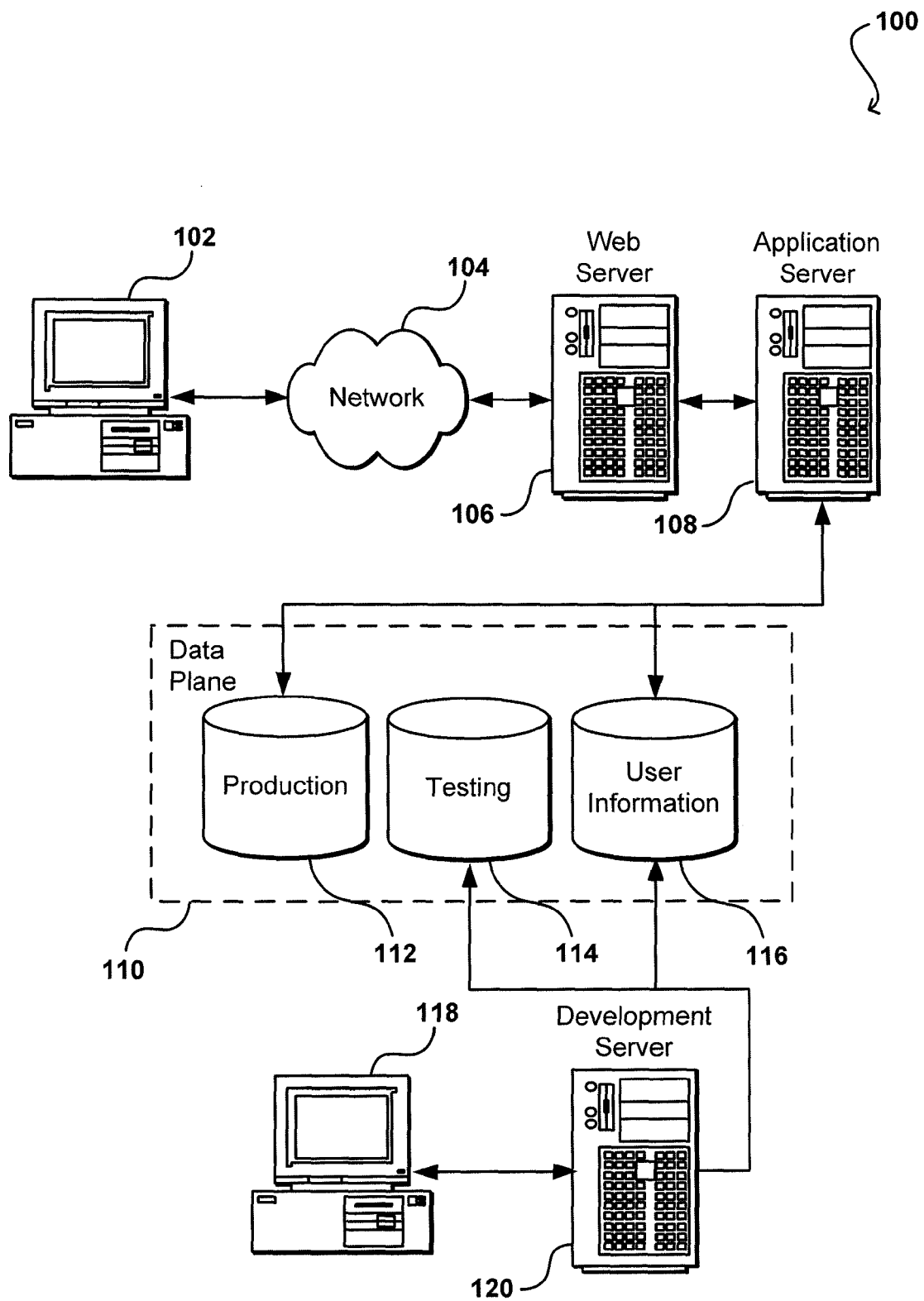
FIG. 1 illustrates an environment in which various embodiments can be implemented.

Systems and methods in accordance with various embodiments of the present disclosure may overcome one or more of the aforementioned and other deficiencies experienced in conventional approaches to managing resources in an electronic environment. In various embodiments, users are provided with full or substantially full or "native" access to one or more hardware resources in a network, cloud, or other shared environment. In other embodiments, users have access to only one or more devices or components, such as a network interface card (NIC) graphics processing unit (GPU) on a peripheral component interconnect (PCI) bus, on a host machine. In situations where the users having access to such a resource can change frequently, it can be desirable to prevent users from, or substantially minimize an ability of users to, modify firmware or other configuration information for the resource, which can affect an ability of a subsequent user to effectively or securely utilize the resource.

In one embodiment, firmware and other configuration information can be encrypted or digitally signed, such as by using public-key cryptography techniques known in the art or subsequently developed for such purposes, whereby users without the necessary private key, other encryption information, or other verifiable credentials cannot update the firmware for a device. In one embodiment, a private key is stored externally to the host, such as may only be available to a cloud manager or other authorized principal, and a public key is embedded with the hardware device such that this public key is isolated from unauthorized users, such as to prevent users from changing the public key without authorization. The public key can be used to decrypt any information encrypted with the private key or validate credentials signed by the private keyholder.

In one embodiment, the private key could be the "root of trust" in a credential chain as known in the art. The public key embedded in the hardware device then could be used to validate other cryptographic key material, such as other public keys or symmetric keys, which would be delegated with the responsibility of encrypting or signing the firmware or other configuration information. In one embodiment, the "root of trust" key, or the public key stored on the hardware device, can be isolated from modification by unauthorized users. Other embodiments involving public-key cryptography for isolating or securing authorized access to resources and data are known in the art, and can apply to embodiments described herein.

In one embodiment, firmware and other configuration information can be encrypted using symmetric key cryptography techniques, such as are known in the art or subsequently developed, whereby hardware devices with firmware or other mutable configuration information use a secret private key to decrypt configuration information. Data that is not encrypted or is otherwise encrypted with an unauthorized secret key can result in an invalid firmware image or configuration information, which can result in non-functional or other such hardware state. The hardware device can contain one or more embedded private keys that are used to decrypt firmware or configuration information that was encrypted by an authorized keyholding principal, such as a cloud manager or similar component. In one embodiment, the private symmetric key used by the hardware device or other keyholder can be kept secret or otherwise isolated from unauthorized entities using techniques known in the art. In one embodiment, this symmetric key is a temporary or "session" key negotiated using standard cryptographic key exchange protocols known in the art, such as Diffie-Hellman.

Other embodiments utilize cryptographic or other isolation techniques for securing authorized access to resources, such as may include using public-key cryptography to perform symmetric key exchange, data obfuscation techniques, or other execution isolation techniques to prevent or deter unauthorized access or otherwise obtain modification privileges to firmware or other configuration information.

In one embodiment, firmware access to a guest operating system (OS), central processing unit (CPU), or similar user-accessible component can be denied, such as by closing a port or communication path, etc. Updates to firmware can instead be received through an update network port of a specific component, such as a network interface card (NIC).

In some embodiments, firmware for the NIC or other devices on a host machine can be updated by routing information from an update port (not accessible by the guest operating system or CPU) to the appropriate device. A bus, such as a peripheral device bus such as PCI, could be isolated by the bus controller from firmware updates from the CPU. Thus, any firmware on the side of the bus "opposite" the CPU could potentially by isolated from firmware updates via the CPU, and instead might be configured to only accept updates received through an external channel, such as through a port of a network interface.

In one embodiment, a mutability period is provided for a host machine or other resource after "power on" or a similar startup event. A secure clock or other counter that is isolated from unauthorized modification can be used to determine the mutability period, after which access to update firmware or other such information can be denied. A guest operating system or guest access can be loaded or allowed only after the mutability period, such that the guest will not have the ability to update the firmware while having access to the machine.

In another embodiment, memory addresses or interrupt vectors on a host can be mapped by a component such as an input/output (I/O) hub. If a guest OS or CPU is not to be allowed to update firmware for a hardware device on the host, the I/O hub can expose only mappings to those memory addresses that do not correspond to the firmware or configuration information. The hub can either not maintain such mappings, or may not expose those mappings to the unauthorized OS or CPU.

Various other combinations and variations are also presented in accordance with the embodiments described and suggested herein.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
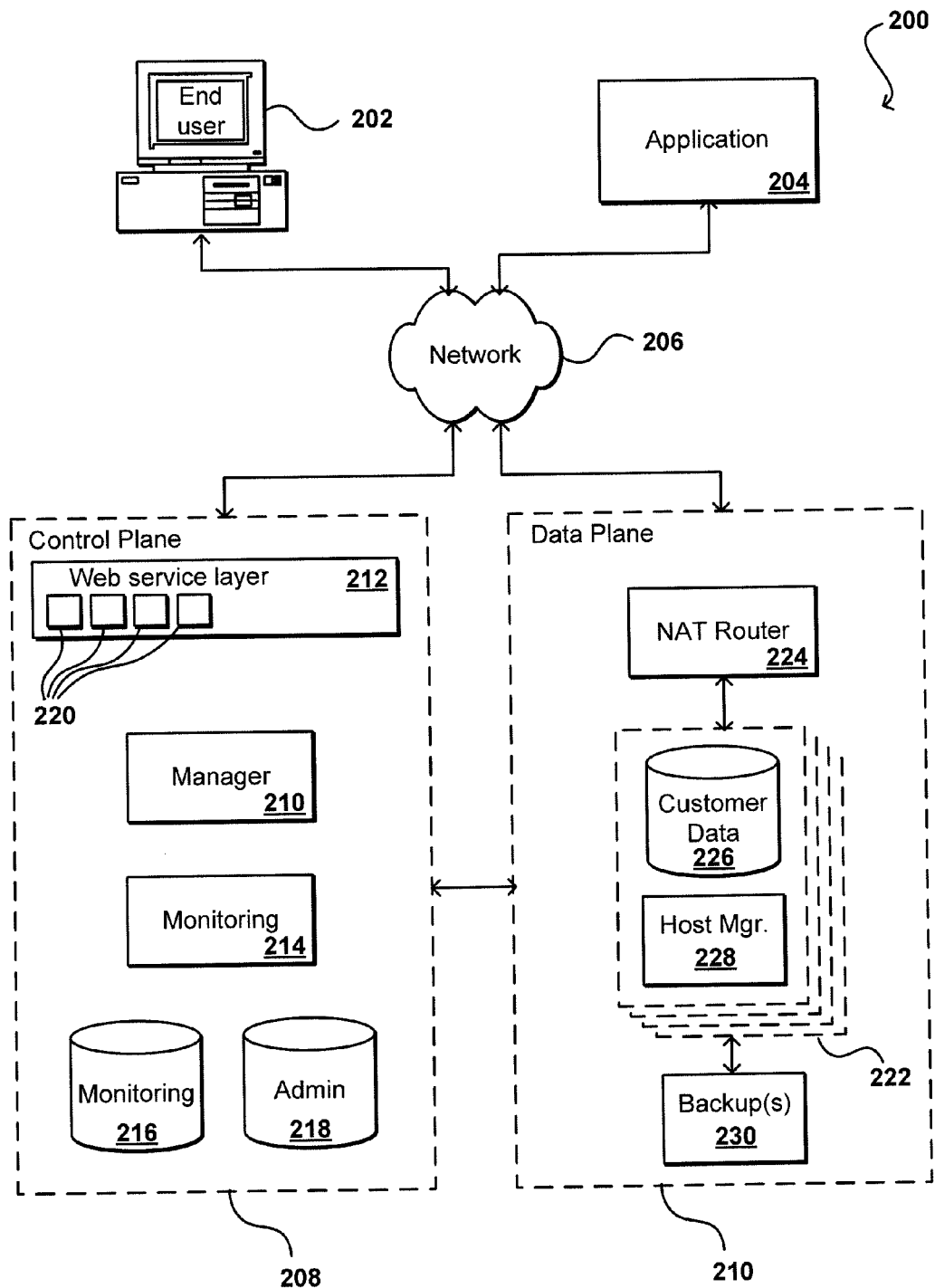
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the DNS address and a port address to be used to access a resource. A user then can access the resource directly using the DNS address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. A IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain "appliance" hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar hardware datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the host or its device(s). In the case of dynamically configurable settings for a virtual machine monitor (VMM) managed by a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard firmware or chipset configurations. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, are known to address various issues specific to device firmware, entire hosts, and other such hardware aspects.

Figure 3:
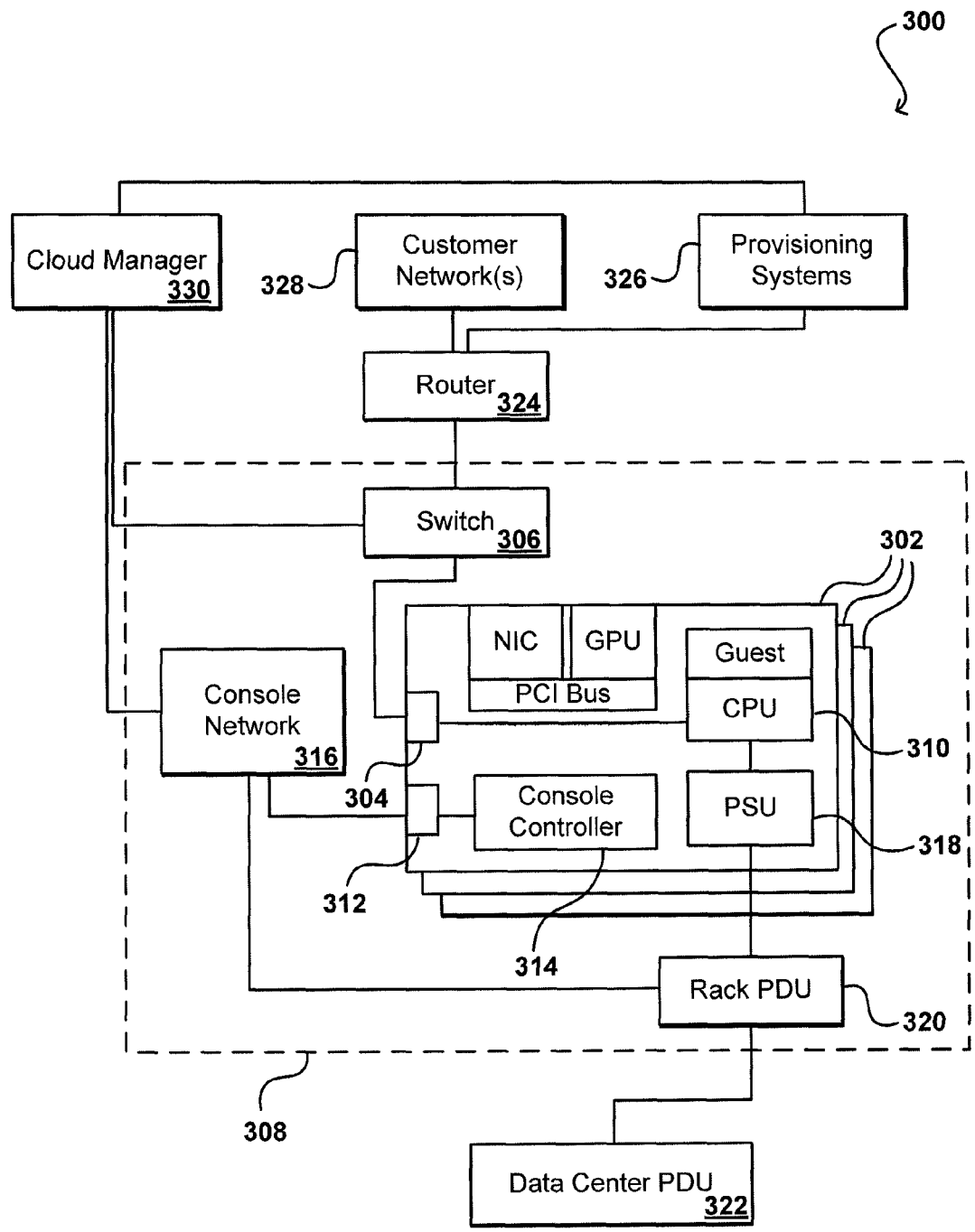
FIG. 3 illustrates a configuration for accessing specific hardware resources that can be used in accordance with one embodiment.

Systems and methods in accordance with various embodiments can prevent the access and/or manipulation of firmware images or configuration information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 300 includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host network traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

In some embodiments, a set of host servers can be bundled together with a network switch, console interface, multi-server power supply, and/or other such components, and deployed as a self contained unit or "virtual rack." Multiple virtual racks might be housed together in a single physical rack cage or other such arrangement. In general, the radius of influence of enabling/disabling network capability or power to servers or network switches can vary according to different combinations or embodiments of server and network connectivity to components such as PSUs, PDUs, network switches, etc.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

When providing guest access in such an environment, there can be various challenges relating to the secure delivery of customer payloads, as well as the controlling of access to the network and the underlying hardware. On a conventional device with a standard operating system, a user having full access can operate, view, and update the firmware on any device or component in the machine. A modern server can have several embedded processors or similar components that each perform a specific task, and each of these components can have firmware and other configuration information that can be modified. Since devices in a cloud or other shared resource environment can be subsequently provisioned to another user, a guest could perform malicious actions such as injecting firmware in the network card to capture or redirect network packets transmitted for subsequent users of that device. These packets could be sent to any address or party, etc., as set forth in the modified firmware. It thus can be desirable to design or configure I/O devices and other bits of firmware on a machine in such way that, combined with aspects such as time to provisioning, these malicious acts would not be possible, or at least would have very limited attack vectors and vulnerability windows in which to execute them. In some cases, even a completely malicious OS with native access on a host could not inject Trojans or otherwise damage the hardware.

Systems and methods in accordance with various embodiments can attempt to minimize the opportunity for guests with access to a resource to modify the firmware or otherwise modify particular aspects of those resources. In some embodiments, once the operating system or other such software is on a host device, permissions can be set such that users cannot access and/or modify specific aspects of the host, such as the firmware of various devices. Typically, a device will expose certain special calls, ports, address ranges, or interrupt vectors that are used for firmware flashing, and there is some level of control as to whether the device allows those events to occur. Even if ports and events, for example, are exposed to a guest user, various approaches can be used to monitor and/or address specific actions taken by that user.

In one set of embodiments, encryption is used to secure firmware and/or other such configuration information for one or more devices on a host machine. As illustrated in the configuration 400 of FIG. 4, and as discussed above, a device 402 such as a server can include several peripheral devices 404 and/or processing components that can each include storage 406 for firmware. This storage can be a dedicated memory component or a dedicated portion of a memory component for the device, for example. The firmware in at least some embodiments can be updated via a firmware image, received over a network, which is stored semi-permanently, or "burned," into the firmware. For example, a cloud manager 408 can instruct a host machine 402 to boot from an external component over a network using a special operating system that contains the firmware images to be applied. During the boot process, the machine 402 can receive the firmware image (and any scripts or other configuration information) to apply the firmware, which can be executed by a CPU 410 and written to storage for the specified device 404, such as a NIC or GPU. Because the CPU has the ability to update the firmware, however, guests of the machine having control of the CPU could potentially modify the firmware for any of the devices on the host machine.

To reduce the ability of guests to modify the firmware for any of these devices, the firmware can be encrypted using one or more secure keys, or any other appropriate encryption approach known or developed for such purposes. Using such an approach, firmware configuration changes may only be performed on behalf of an entity that has access to the necessary key(s) or other encryption information. For example, firmware updates can be secured using any of a plurality of cryptographic protocols, such as by using an isolated channel (e.g., performing key exchange and using a shared secret key to encrypt communications) or by using a signed configuration where message integrity is verified using standard signature verification. In some embodiments the cryptographic "endpoint," such as a peripheral device, is capable of performing isolated cryptographic operations, which are independent of central computing resources such as a CPU or trusted platform module (TPM). The type or use of isolation can depend at least in part upon the threat assessment. For example, hashing could be performed by an off-chipset computing entity and transmitted over an external bus, but this approach can provide a somewhat lower level of security if the external bus has known interception vulnerabilities.

In at least one embodiment, an asymmetric keying process is used wherein a key has two parts: an encryption portion (e.g., a private key) and a matching decryption portion (e.g., a public key). One such keying process 500 is described with respect to FIG. 5. Although the figure illustrates an example "flow" of the process, it should be understood that various steps of the processes described herein can be performed in parallel, concurrently, or in different orders, and that many other variations exist within the scope of the various embodiments. In this example, a component such as a cloud management system, for example, creates or selects an encryption/decryption key combination to be used to encrypt information for at least one hardware device 502. The decryption portion, or the public key, can be provided for storage on the hardware device 504. In some embodiments the decryption key can be passed with (or separate from) the firmware image to be stored on the respective device, while in other embodiments the public key is embedded in the device. The encryption portion, or private key, can remain in a data store or other appropriate local or central storage location 506, such as for a cloud environment, that is inaccessible to guest users. When new firmware is to be stored to the hardware device, for example, a firmware image can be encrypted using the private key 508 and provided to the hardware device 510, which can use the public key to decrypt the firmware image and burn the firmware to the device. Only firmware that is encrypted using the private encryption portion will be able to be decrypted and stored to the respective device. The hardware device can be provided with instructions, either in hardware or software, or a combination of both, to reject any firmware images that are not encoded using the private key 512. While a guest user could potentially extract the decryption key from the firmware, the guest would at best be able to decrypt firmware provided over the network, but would not be able to encrypt firmware to be decrypted and installed as the guest still does not have access to the matching encryption portion of the key.

Figure 5:
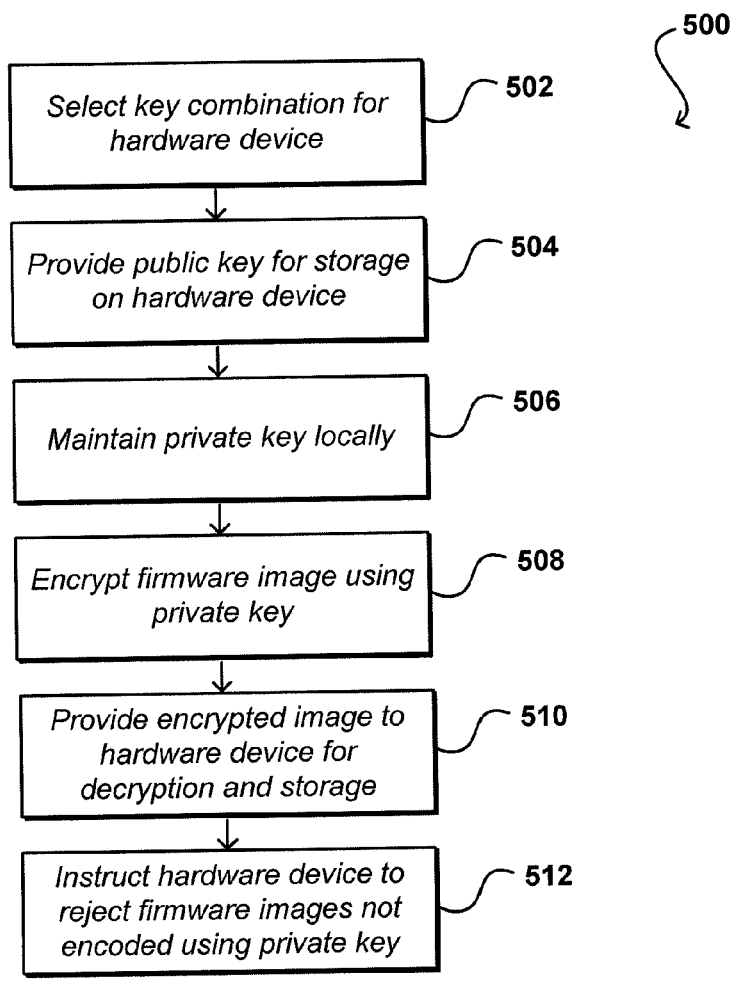
FIG. 5 illustrates an example of a process for securing firmware updates that can be used in accordance with one embodiment.

A similar workflow to that described with respect to FIG. 5 can be used to sign and validate firmware images in accordance with other embodiments. For example, a component such as a cloud management system can create or select a key combination, with a public key being provided for storage on the hardware device and a corresponding private key being stored in a data store or other appropriate local or central storage location that is inaccessible to guest users. When new firmware is to be stored to the hardware device, for example, the appropriate firmware image can be signed using the private key and provided to the hardware device, which can use the public key to validate the signature and burn the firmware to the device.

In order to prevent the guest from modifying the asymmetric algorithm used, the public key in some embodiments can be stored by the manufacturer into the hardware itself (e.g., into a chip) such that the guest cannot modify the decryption key. If the key were simply stored in firmware, for example, the guest could potentially replace the decryption key and use a new encryption key to update the firmware on the device. With the decryption key not being modifiable, at least by unauthorized users, firmware images can only be accepted that are secured with the specified encryption key. In some cases, manufacturers, third parties, or even trusted guests can be supplied with the encryption portion where those parties are trusted to provide firmware updates on a device. In some embodiments, special key combinations can be used for specified users or parties, where the decryption portion is only installed on specific devices, such that those users can only update firmware on the specified devices. This provides another level of security against users modifying resources that will subsequently be offered to other users. In some cases, the hardware devices can include rotatable keys or other mechanisms known or used in the art for changing keys over time, such that even a malicious actor obtaining a private key will only be able to use that key for a limited period of time, if at all. One or more signing keys thus can be used to control which images are flashed onto the hardware of a host device.

Figure 4:
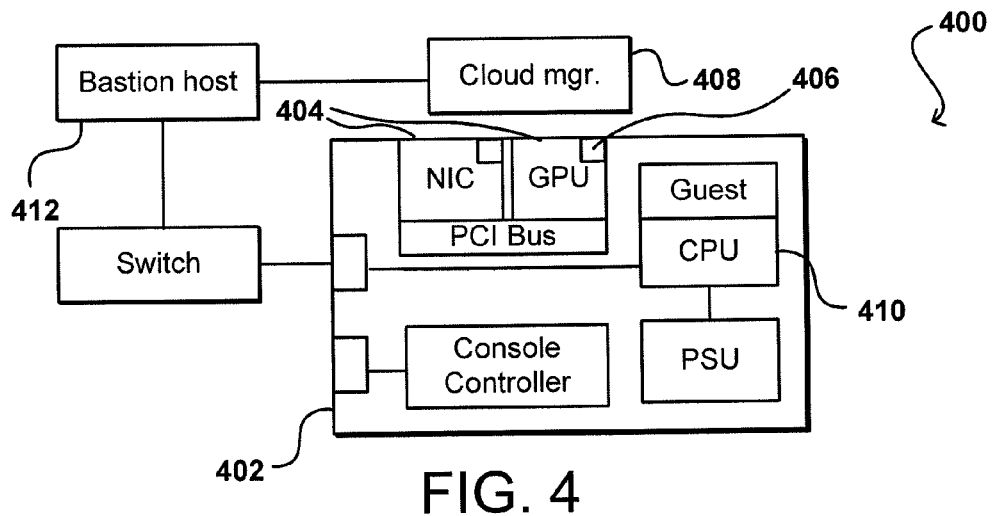
FIG. 4 illustrates a configuration for accessing firmware of hardware resources that can be used in accordance with one embodiment.

In some embodiments the keys are managed by a trusted network host, such as what is referred to as a "bastion" host 412 as illustrated in FIG. 4. A bastion host in general is a dedicated computer for handling a specific task, with other services being removed to reduce attack vectors or shorten attack opportunity windows to the host. A trusted host can manage keys for a set of hosts using one or more secure key combinations. If the decryption portion is stored permanently in hardware then the ability to rotate or change keys can be limited, but when the key portions are modifiable the host can have the ability to rotate key combinations for each host, and can use the same key combinations for multiple hosts assigned to the same or different users, etc. In some cases the signing of a firmware image with a secure key can require multiple persons, such as two or more engineers, to sign the firmware image in order to reduce the likelihood of one malicious actor signing an unauthorized or unexpected firmware image.

Figure 6:
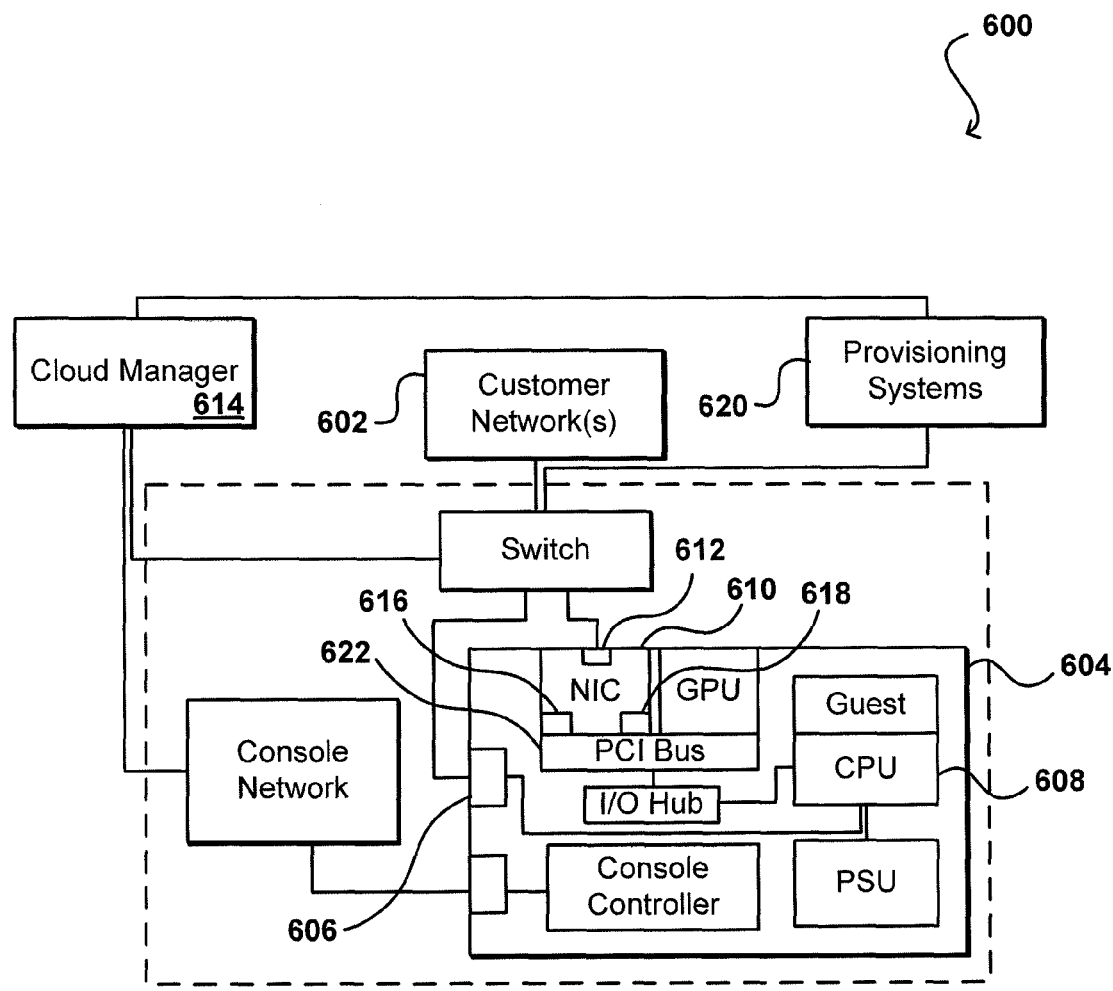
FIG. 6 illustrates a configuration for updating firmware of various resources on a host device that can be used in accordance with one embodiment.

In some embodiments, updates to firmware (or other such configuration information) can be protected by only allowing for updates through paths that are inaccessible to guests on a machine even when guests have substantially full access to the host hardware, such as paths that are isolated or otherwise independent of the central computing resources (e.g., the CPU). FIG. 6 illustrates a configuration 600 wherein a customer network 602 (including one or more computing devices) is able to communicate with a hardware device 604, such as a host machine, through a network port 606 of the device. As discussed above, firmware is conventionally updated for such a device by the operating system on the hardware using the CPU 608. Updating the firmware via the CPU is relatively simple to implement, and since in most environments the user owns or has dedicated use of the hardware over a period of time there typically is no reason to prevent a user from updating the firmware when the user has native access to the device. When "renting" a device, or otherwise providing short periods of access to users across a cloud or similar environment, however, there can be many reasons not to trust each user of a device. Even if the user does not intend to do anything malicious, changes to the firmware or other aspects can cause problems with compatibility, performance, etc., as discussed elsewhere herein.

Accordingly, systems and methods in accordance with various embodiments take advantage of the fact that certain network interfaces can be used that are not exposed and/or accessible to a guest user of a the hardware. For example, devices such as network interface cards (NICs) 610 and other peripheral devices can have a separate network communications port 612 that may not be exposed to a guest user of the hardware. A network interface thus can be programmed, configured, and/or manufactured to only enable access to local firmware 618 or other configuration information, such as by utilizing a dedicated network port as an "out-of-band" firmware update port. This update port can be dedicated for access by a control network, for example, such that a guest user can be denied access to the port, and might not even be able to view or detect the port as part of the configuration. Using such an approach, firmware updates and other such processes can be restricted to information received over a port and/or path that is not exposed to guest users. In some embodiments the updates can be received through a console port of the machine, allowing a remote console to manage the firmware of the device, although any other appropriate port can be used where the information can be directed to the appropriate component, and where access by the user can be controlled or restricted. In some cases, a port on a peripheral device such as a NIC or GPU can be used to update firmware throughout the host device 604. Various other network interfaces can be used that are not exposed to, or accessible by, a user, processor, or guest OS of a host machine or hardware device.

Further, it should be understood that the configuration of FIG. 6 is merely an example of one possible configuration, and that many other configurations can be used within the scope of the various embodiments. For example, various types of network interface can be used to perform tasks such as communicating with provisioning systems and providing a secure channel inaccessible to a user of a host machine. For example, an interface can be provided via any component connected to a PCI or other high speed bus, and an interface can exist on a northbridge, southbridge, or other controller hub on a host machine. Further, dedicated network interfaces may be built into a machine or device. There can be multiple I/O hubs or communication paths in some embodiments, while functionality is highly integrated and not provided by discrete components in other embodiments, as various functionality can be delivered "logically" in a number of different ways as known in the art.

In some embodiments, a hardware device such as a host can be configured to boot from the network or from local hard drives, for example. When a firmware update is to be applied to a device, the device can be power cycled or otherwise shut down and restarted. The boot action for that device can be configured to boot from a special RAM disk or other component that applies firmware updates, which can be received over the specified network port of the device. In some embodiments, ports can be effectively "moved" such that the ports can no longer be exposed to the guest operating system, but will only be exposed to a management console, etc. In some embodiments an extra network port and/or bus can be used to allow firmware updates to be sent to the device. In other embodiments, the standard Intelligent Platform Management Interface (IPMI) or a similar interface or protocol can be extended for console management to accept firmware updates, such that an existing console port can be used to receive and apply firmware updates.

In some embodiments, a network interface card (NIC) or other PCI (Peripheral Component Interconnect) device can be utilized that includes a network port that functions as a small embedded computer. Such a device can communicate with other components in the host system, such as by sending messages over a PCI bus or similar communication path(s). In some embodiments the host machine would first be placed in a quiesced state, where only certain administration operations are allowed to execute and other operations are halted. In some embodiments use of a network port for updates can be combined with use of a PCI bus to direct instructions from an alternate source to produce a PCI device that operates as a control plane, or an embedded Linux or similar computing device operating on a PCI card in the host.

In some embodiments, the entire peripheral bus (e.g. PCI bus) can be isolated using the PCI control hub or other chipset to isolate user access to control plane functionality from the CPU.

In other embodiments, as discussed, network interfaces can be exposed through the I/O Control Hub or other I/O chipset that is not necessarily part of the PCI standard and/or not necessarily part of a card-based device. Such an interface can similarly communicate with various components in the host system.

Some embodiments can take advantage of a specialized "immutable" NIC, which cannot be updated from the CPU or host operating system, but only via an external port that is physically part of the device. In the special case of a NIC (or other similar networking device), firmware updates might only be allowed from a network port on the card. From the point of view of the system central computing resources (e.g., the CPU), the device configuration/firmware is therefore immutable. The NIC and other peripheral devices typically have a certain amount of firmware that usually is updatable from the host system, driven by the processor side of a peripheral bus (e.g., a PCI bus). The host can include an input/output (I/O) hub 624, or similar component, that enables communication between the CPU and components attached to the PCI bus 622. The I/O hub or similar component can manage a set of mapped addresses, interrupt vectors, or other communication mechanisms for devices on the PCI bus such that the CPU can communicate directly with those devices. Such a configuration can enable the CPU to communicate over an appropriate channel to send information to a peripheral device to perform tasks such as updating firmware for that device. In this example, however, the I/O hub or the individual peripheral devices can be designed or configured such that the firmware is not updateable from the CPU.

In some embodiments, the peripheral devices can only be updated using commands that come in over a specified port from the network, data center, etc. For chipsets that bridge buses, for example, updates can be configured to only be accepted from the "peripheral" side of the bridge. For example, virtualization technology for directed I/O (Intel's VT-D) configuration changes might be accepted only from the PCI bus side rather than the CPU side. The configuration information could originate from a peripheral device directly connected to the peripheral bus, and the device itself would ideally be "hardened" or "immutable" by central computing resources by ignoring or otherwise not exposing update commands originating from the CPU side of the chipset bridge. If a network manager wants to update the firmware in a GPU, for example, the commands can be received through the network port on the NIC and directed, by the I/O hub, over the peripheral device bus to the GPU. Thus, a firmware updating capability connection between the CPU and at least one peripheral device on the bus is effectively severed. Guests having access to the CPU will not be able to modify the NIC or other such device. The CPU can still communicate with the NIC and other peripheral devices for various purposes, such as using the network device to perform networking operations, but not in a way that allows persistent changes to firmware or other device configuration state.

Figure 7:
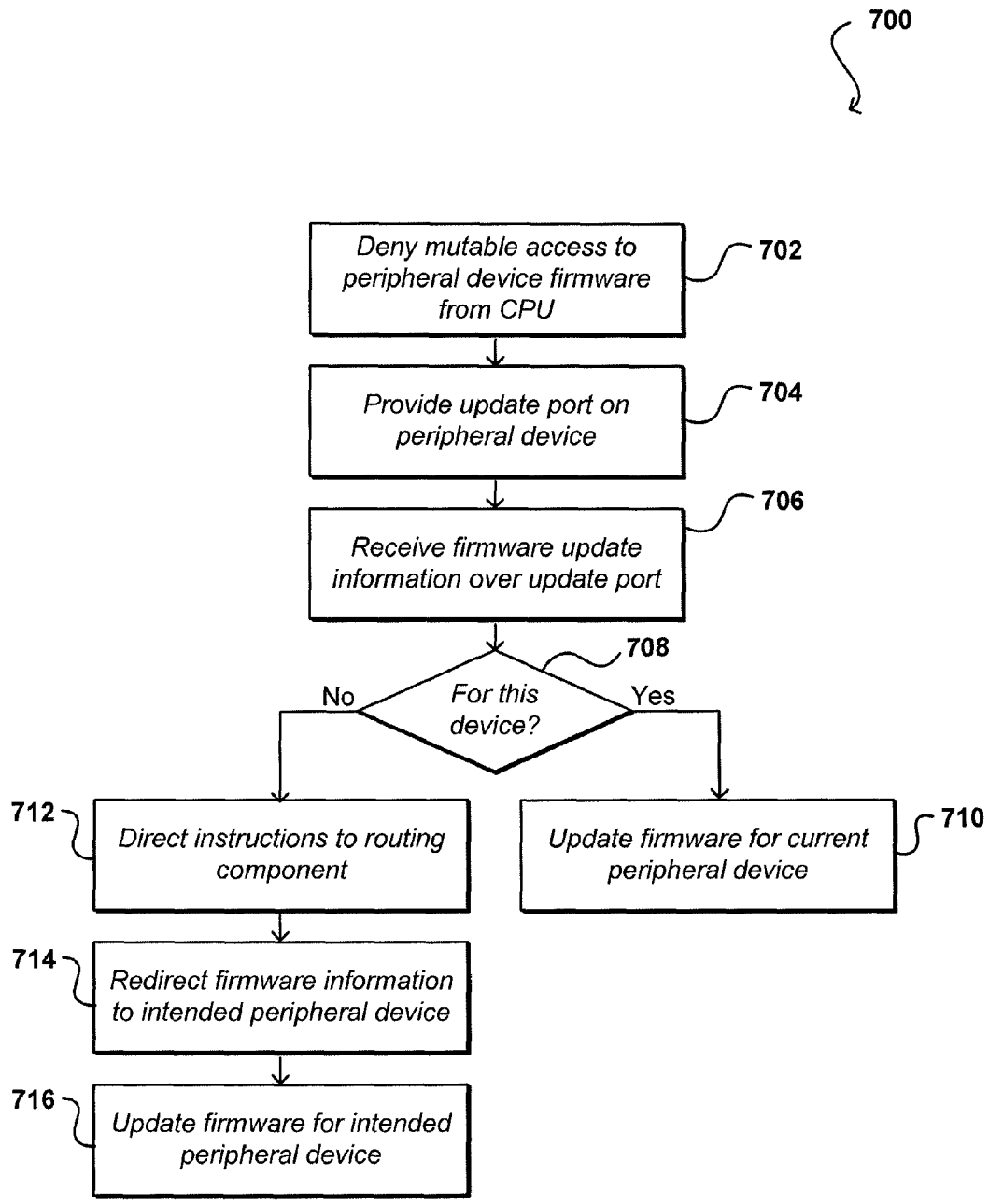
FIG. 7 illustrates an example of a process for updating firmware from an external channel that can be used in accordance with one embodiment.

Commands thus can be received into the NIC over the network port, and peripheral devices on the PCI bus can be configured to accept these commands. FIG. 7 illustrates an example of a process 700 for updating a peripheral device using a network port of a peripheral device such as a NIC. In this example, mutable access to firmware in a device from the CPU is prevented 702, such that a user or guest OS can only access at least certain hardware in an immutable way. In some embodiments, the I/O hub can "sever" the communication channels between the CPU and specific memory addresses or interrupt vectors of the devices on the peripheral plane by not maintaining (or at least not exposing) a mapping between the CPU and the parts of the peripheral devices that are mutable. The CPU thus would never have an image of the mutable region(s) that require secure isolation. At least one network port can be provided on a peripheral device on a host machine 704, which would be able to receive firmware updates (or similar instructions) from a provisioning manager or other such device, system, or service. When an update is to be performed, commands and/or information can be received by an update port of a peripheral device 706. The peripheral device can analyze the instructions to determine whether the updates are for that device, or for another peripheral device on the host, for example 708. If the updates are for that peripheral device, here the NIC for purposes of explanation, a processing component on the NIC can burn the firmware image into the appropriate firmware location on the NIC 710. If the updates are instead for firmware for another device, such as a GPU in this example, the instructions can be directed to a routing component 712, such as an I/O hub for a PCI bus, which can determine that one of the devices on the PCI bus is attempting to communicate with another device on the bus, and can redirect the commands and information 714, such as by using a maintained address mapping. It should be understood that other components for routing communications along other paths in a device or groups of devices can be used as well in various embodiments. Routing decisions can be made based on various policies, including the bus address of the source device making the update request. The instructions can be received by the target component 716, here the GPU, which can burn the firmware image into the appropriate firmware location for the GPU or otherwise make configuration changes. Using such an approach, outside ports can communicate with any components on the external side of the PCI bus via the I/O hub. This communication can allow for the updating of not only firmware, but any configuration or other information on a component in a host device, and can provide a communication path that is not accessible to a guest, CPU, host operating system, or any other component falling outside the update path(s).

While updating through an external port and/or utilizing asymmetric keys can be effective approaches for preventing guest users from updating firmware and other such configuration information, these approaches still can be susceptible to user manipulation as the user needs access to the device for purposes other than updating firmware or configuration information, and a user either having a private key or being able to reprogram an I/O hub, for example, might be able to modify the firmware for a certain device.

Systems and methods in accordance with certain embodiments can address these and other potential problems by preventing an overlap of the mutability period of a device and the access to a device by a user or guest OS. In certain embodiments users are prevented from modifying firmware or other such configuration information by controlling the times at which a user operating system (OS) is executed or provisioned on a host machine or other such resource. As discussed above, updates to firmware often are executed after booting of a machine. In some embodiments, devices such as host machines can be configured to only allow firmware updates during a limited period of time after physical "power-up," or during an initial booting phase of the hardware. After this initial boot period, the machine can be configured such that no updates can be made to the firmware until the machine is again power cycled, etc. Such an approach can be implemented in some embodiments by specifying a time, period, or phase after which users are granted native access to the machine. For example, a secure clock or other such isolated countdown mechanism can be included in the hardware that is dedicated to the protection of the firmware and/or configuration information. A secure clock in this context, for at least some embodiments, can be "secure" in the sense that the mutability period cannot be activated, and values or functionality of the clock cannot be adjusted from an unauthorized external source, at a time when a potentially adversarial guest is currently provisioned on the device having access to the clock, even if the host has been otherwise compromised.

A secure clock in some embodiments can be used to trigger a hardware-based access control (e.g., physical lockout) to the configuration subsystem. A secure clock 616 can be implemented in a particular device, such as a NIC 610 as illustrated back in FIG. 6, while in other embodiments a central clock can be placed on the motherboard or I/O control hub or in any other appropriate location that can define the mutability period for one or more devices on a host machine. If device-specific counters are used, or if different trigger values are used, for example, this mutability period can vary between devices. It should be understood that the clock component 616 is implemented in only certain embodiments discussed herein, and the inclusion of a clock in FIG. 6 should not be interpreted to imply that a secure clock is required in other embodiments, such as where updates are made from an external channel, although such combinations are possible within the scope of the various embodiments.

In one example the firmware for a device can only be flashed within sixty seconds after "power on". The receiving of power to the device can trigger the secure clock to begin the countdown for the mutability period. After sixty seconds, as determined by the secure clock 616, the firmware 618 can block all relevant modification ports, addresses, interrupts, or other configuration mechanisms, such that no further updates are allowed. As long as the customer image or operating system (OS) is not booted, applied, and/or executed during the mutability or startup period, a user even with substantially full access to the host resources can be prevented from modifying the firmware via the CPU 608 or any other path in the host 604 to the device 610. Network systems, such as a cloud manager 614 or provisioning system 620, can control the time at which a user operating system is loaded, for example, and can wait to execute the code until such time as the delay period determined by the secure clock expires. Because the modification ports are blocked before the user is granted access to the machine, the user is effectively blocked from updating the firmware or other configuration information for the device. In some embodiments the time period can be configurable, such as by setting or adjusting the delay period on the secure clock, or the time(s) at which an action is triggered. With physical access to the host, a physical switch could be placed on the device which can artificially suspend the clock while the device is being serviced by an operational technician in the data center, for example. Such configurability can be implemented using any of a variety of secured approaches, such that a user is not able to extend the delay period until after the user is granted access whereby the user can have access to update the firmware.

Before the user OS is provisioned and/or executed on the host, the permissions for specific devices on that host can be set such that the user cannot access or modify the firmware for those devices. Since each device can control the exposure of certain calls and/or ports that are used for firmware flashing, in at least some embodiments, at least some of the device ports can be opened during the delay period after physical power on, after which the ports are closed and/or calls disallowed. The customer OS is subsequently loaded on the machine. The untrusted customer-supplied image thus will not be loaded until the mutable period of the device has elapsed. For certain devices of the machine, the user might be allowed access to the firmware, such that certain devices might not utilize the secure clock or delay period, and instead may grant access to the user or might rely upon another security mechanism.

As discussed, the length of the delay period can be configurable in certain embodiments. In one embodiment, a discovery protocol can be utilized whereby a device can determine whether to use a countdown timer and, if so, what the delay period should be. The device in one embodiment can query from the network, such as from the cloud manager 614, and receive a policy relating to the use of a secure clock and the appropriate delay period to be used, which can vary by user, application, etc. A protocol such as PXE can be used for network booting of specific machines, including an extensible data set allowing for the creation of proprietary tags to specify any period during which a machine should allow for firmware updates or other such modifications. In some cases, the machine can be configured to not allow firmware updates whatsoever (at least until the next power cycle). Such dynamic configuration changes can be used instead of hard-coding times into the hardware, for example, but may offer a lower level of security in at least some examples as a user might have an attack vector wherein the user can somehow access the configurable aspects of the hardware.

In the case of a hardware implementation, a secure timer could start at the beginning of the boot process for each device having modifiable firmware, for example. The time period could begin at any appropriate time, such as from PCI/device power up or other suitable maintenance period. If the device instead has the time configurable by a network packet, the timer could be started at a subsequent time, such as when the policy is received and analyzed for each device. In order to trust the network packet, a type of security can be utilized, such as to securely sign or encrypt the packet, etc.

Figure 8:
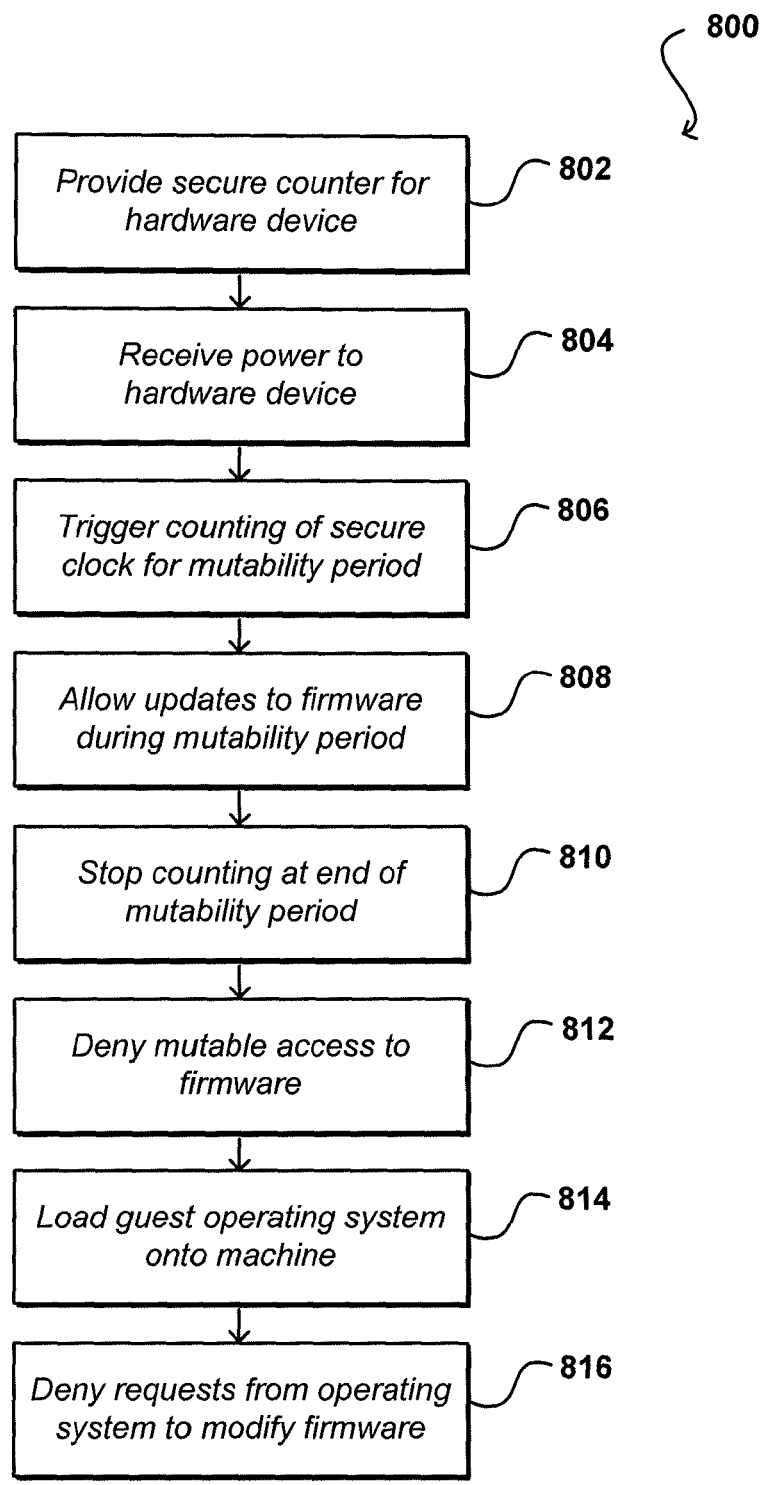
FIG. 8 illustrates an example of a process for loading a guest operating system after a mutability period that can be used in accordance with one embodiment.

FIG. 8 illustrates an example process 800 for providing a limited mutability period for a device that can be used in accordance with one embodiment. In this example, a secure counter is provided for a hardware device 802, such as a device-specific clock on a peripheral device or a centralized clock on a motherboard of a host device. Power is received to the hardware device 804, which triggers the secure clock to begin counting the time for the mutability period 806. During the mutability period, updates to the firmware of the device are allowed 808. When the secure clock reaches the end of the mutability period 810, the clock triggers the device to deny mutable access to the firmware 812, such as by closing any appropriate ports and/or disabling specific calls. The guest operating system (OS) is subsequently loaded onto the host machine 814. Any attempts from the guest OS to update the firmware will be denied 816. Various other or alternative steps can be used in various orders in accordance with various embodiments, as discussed and suggested herein. For example, if the time is configurable from an external source, the device could, at a time just after power-on, receive a policy over the network that determines the applicable period to be used for the clock, which can vary based upon factors such as the type of device, identity or classification of the guest to be provisioned, etc. In some instances, the clock may not be used, such as where no updates are to be allowed or where any updates are to be allowed, etc.

In some embodiments a guest user might be granted access to a device using one of a variety of processes for device assignment and/or memory mapping, such as I/O MMU or VT-D technology as discussed above, such that the ability of a guest user to make configuration and/or firmware changes can be blocked by the chipset virtualization technology. Conventional device assignment technology creates a virtual memory map (or other such mapping) between each appropriate device and the guest operating system (OS) address space. Device functionality can be made available to the guest OS by configuring the chipset to translate particular memory address ranges in the guest to accessible addresses on the devices (and vice versa). The guest OS can be prevented from performing actions such as making firmware and/or configuration changes to a device if there is no mapping for those actions, such as a mapping to one or more configurability mechanisms or other such mechanisms that can be used to update firmware or other configuration information. For example, updating firmware for a peripheral device might require mapping between the guest OS and specific memory addresses for the peripheral device. If there is no mapping stored (or exposed) for these memory addresses, then the guest OS cannot access those addresses and thus cannot modify the firmware or other configuration information. A guest OS thus can be granted access to the immutable portions, by exposing mappings to those memory addresses, but denied access to the mutable portions. In some cases this partial mapping may not be possible, such as where required guest functionality shares memory address ranges with functionality that needs to be blocked. Specific hardware might need to be selected or designed in various embodiments that allows for separate mapping of these address spaces. In some examples, the guest operating system drivers might create unnecessary dependencies on the address ranges that need to be blocked, such that even if isolation is possible as per the hardware design, there is no support in the software.

Figure 9:
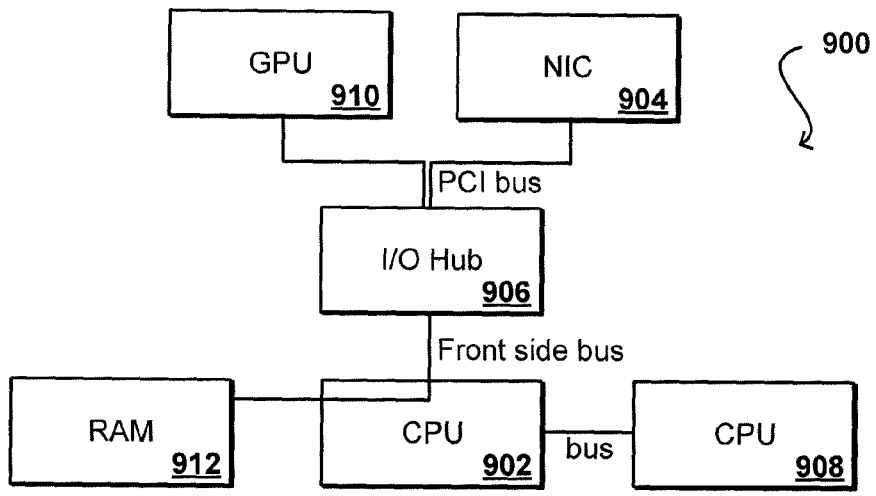
FIG. 9 illustrates an example of a configuration that can be used to map and expose memory addresses in accordance with one embodiment.

In an example using IOMMU or a similar technology, a guest partition can be granted native access to a peripheral device, such as a NIC or GPU. A guest user having an assigned device can get "full" native access in some embodiments. FIG. 9 illustrates some basic components of host hardware 900 for purposes of explanation, but it should be understood that various other components can be used as is known or is subsequently developed for such purposes. A CPU 902 in the host can have a set of reserve memory addresses that are used to interact with any device, such as a NIC 904, connected via a PCI bus or similar connection. Various interrupts also can be used to interact with the NIC in various embodiments. When a device such as a NIC is assigned to a guest partition, a memory mapping is established between the CPU 902 and the NIC device in a secure way, such that the device can only communicate with the main memory that is exposed via the virtual memory mapping. In this example, the NIC communicates with an I/O hub 906 through the PCI bus. The I/O hub can also be connected to a CPU 902, which in turn can be connected to another CPU 908 and other components on the device using an appropriate bus or other connection. The CPU thus communicates with the NIC via the I/O hub 906. The NIC 904, and any other peripheral device 910 having a path via the PCI bus, can transfer information directly from RAM 912 or other memory for the CPU 902 into memory for the peripheral device 904, 910 using DMA (direct memory access) or a similar technology.

The memory address mapping in various embodiments is a direct mapping, such that there can be reserved sections of memory in RAM for the CPU and the peripheral devices that are exposed via the bus. In an environment such as cloud computing, however, there can be differences between virtual addresses for a guest and real or actual addresses of the underlying hardware. An I/O Hub can be programmed to perform a remapping of the addresses, such that instead of pointing to a virtual address page such as 0x0100, the mapping can instead be redirected to a physical memory page such as $0_x0200$. The mapping thus can direct to a different section of RAM in main memory, which may have been allocated to the guest partition for a particular guest. Memory mappings for separate guests can be separated accordingly. The memory mapping in a table thus can indicate that 0x0100 in virtual memory maps to 0x0200 in real memory, for example. The mapping can also handle interrupts, such that virtual interrupt 16 might map to interrupt 14 on a NIC, for example.

If a guest attempts to update firmware in one embodiment, the update would require a mapping by the I/O hub (or a similar component) to pass information from main memory to the correct memory space on the desired device. In some embodiments, these update attempts can be blocked simply by using mappings or device assignment by the I/O hub to make the firmware on the device unburnable, or otherwise immutable, from the CPU. The device can be assigned and mapped for a specific guest, but the mappings can be controlled such that the guest cannot access the necessary memory space to update the firmware. The I/O hub can effectively segregate memory and/or interrupts, and only maintain or expose certain mappings for the guest. Without a proper mapping, for example, a guest would not be able to call the appropriate interrupt, or fill a register and invoke a function that burns a firmware image into the NIC, etc. Any command requiring the mapping (in either direction) would fail for not being able to access the appropriate memory space. The segmented mapping by the I/O hub can occur without knowledge by the NIC, GPU, CPU, or other such device. In some embodiments, each device might include specific privileged and unprivileged command registers, etc.

Figure 10:
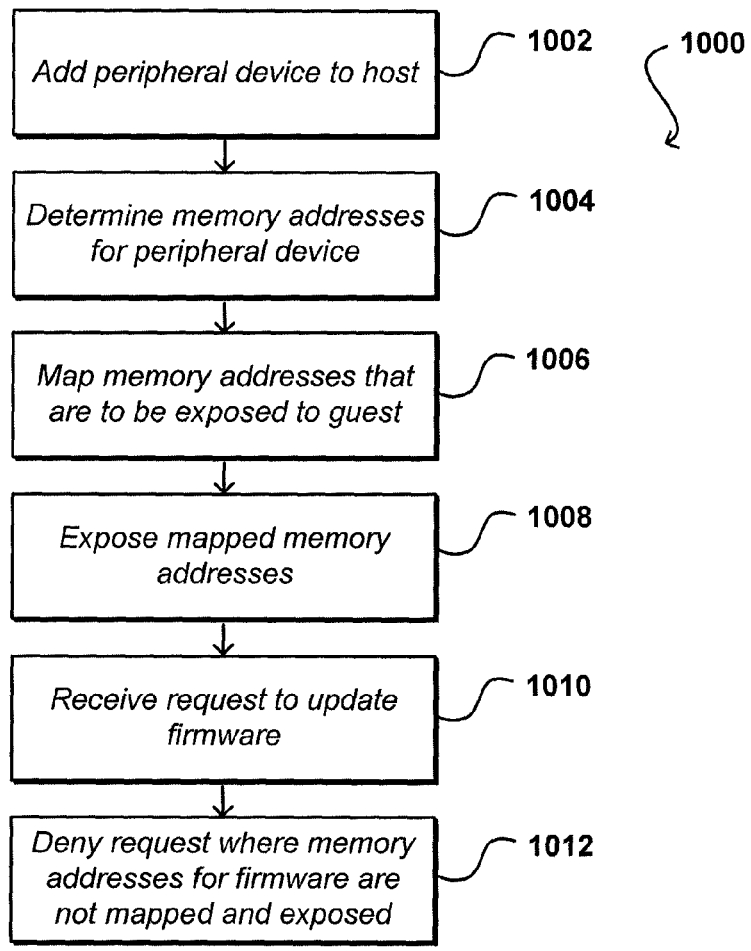
FIG. 10 illustrates an example of a process for mapping memory addresses that can be used in accordance with one embodiment.

FIG. 10 illustrates an example process 1000 for preventing mutable access to firmware on a device by a guest on a host machine that can be used in accordance with various embodiments. In this example, a peripheral device is added to a host 1002, such as by inserting a NIC into a PCI bus for the host. Memory addresses for the device are determined 1004, such as those that are used for immutable access and those that are used for mutable access. Mappings are determined for memory spaces that are to be exposed to the CPU or guest operating system 1006, and these mappings are exposed to a user 1008. If a request is received from a user to update the firmware for the device 1010, the request can be rejected as there is no mapping maintained to the necessary memory space for the device 1012.

Additional security measures can be taken in accordance with various embodiments. For example, even in systems where a user or guest operating system is prevented from modifying the firmware or other configuration information for a device, any attempts to update the firmware can be logged, tracked, or otherwise stored for analysis or other such use. In some embodiments, events can be logged such that an administrator can determine which users have attempted to update firmware. In other embodiments, there can be one or more definable actions on an attempted firmware update. Thus, the system can be configured not only to disallow firmware updates, but also to track attempts at updating the firmware. In some cases, a system can be configured to notify a console manager, cloud manager, or other such component upon an update attempt, and can perform a specified action such as to halt the machine or trigger an alarm. In some cases, administrators or other such provider employees can be notified upon an attempted update such that an appropriate action can be taken. Conventional devices provide no real audit trail for attempted updates or updates, at best indicating when the last update occurred and maybe a current version number. Once a machine is flashed and rebooted, any information regarding previous flashing typically is lost. Some conventional systems might maintain a log of flashing events, including information such as time of update, but such systems do not block update attempts as discussed herein or trigger actions based on the update attempts as suggested.

Further, many of the approaches discussed herein can be combined to provide higher levels of security. For example, a secure key can be used with a limited mutability period or updates from an external port. Keys or external ports also can be used where mappings are not maintained for a guest OS. Various other combinations are possible as well, the selection of which can depend upon factors such as the threat model and desired security level.

In some embodiments guests might be allowed to update firmware, while in other embodiments guests might instead be able to select or determine policies that dictate which firmware versions or updates, offered or approved by the provider, are to be applied to a device at any time for that guest. For example, one guest might select to use firmware versions that have been tested for a long period of time, while other users might prefer firmware that offers improved performance but has not been as thoroughly tested. Various other options can be presented as well. The policies can be determined for the hardware upon startup, such as by contacting a central cloud manager or control plane component. In some cases, the firmware to be applied can be determined dynamically, based upon factors such as the requirements of the guest for the hardware during the provisioned session.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for securing firmware, comprising:

under control of one or more computer systems configured with executable instructions, using an asymmetric keying protocol to obtain a private key and a corresponding public key, the private key capable of being used to encrypt information and the public key capable of being used to decrypt the information encrypted using the private key;

providing the public key to a peripheral device on a host machine, the peripheral device including updateable firmware;

maintaining the private key in a secure location external to the host machine;

encrypting a firmware image for use in updating the firmware on the peripheral device using the private key; and transmitting the encrypted firmware image to the peripheral device, the peripheral device being operable to use the public key to decrypt the encrypted firmware image and store information from the firmware image to the firmware on the peripheral device, wherein an attempt to update the firmware will be unsuccessful unless information for the attempt is encrypted using the corresponding private key.

2. The computer-implemented method of claim 1, further comprising:

periodically providing a new public key to the peripheral device that corresponds to a new private key.

3. The computer-implemented method of claim 1, further comprising:

requiring two authorized personnel to verify the firmware image before encrypting the firmware image using the private key.

4. A computer-implemented method for securing information in a hardware device, comprising:
   under control of one or more computer systems configured with executable instructions,
   storing public security information in a first location for the hardware device, the public security information including decryption or signature validation information;
   storing private security information in a second secure location external to the hardware device, the private security information including encryption or signing information, the private security information not being exposed to a user provisioned on the hardware device;
   configuring the hardware device to process an update request for configuration information on the hardware device that is secured using the private security information and is capable of being processed using the public security information stored on the hardware device, processing of the update request including decrypting the update request or validating a signature for the update request; and
   configuring the hardware device to reject an update request that is not secured using the private security information,
   wherein the user provisioned on the hardware device is unable to update the configuration information.

5. The computer-implemented method of claim 4, wherein storing public security information in a first location on the hardware device includes writing the public security information to a chip on a motherboard, wherein the public security information is not modifiable.

6. The computer-implemented method of claim 4, wherein storing private security information in a second secure location external to the hardware device includes storing the private security information to a data store for a cloud manager system.

7. The computer-implemented method of claim 4, wherein the hardware device is a peripheral device or input/output (I/O) controller on a host machine.

8. The computer-implemented method of claim 4, further comprising:
   managing the private security information and public security information using a central bastion host.

9. The computer-implemented method of claim 4, wherein the update request for configuration information on the hardware device secured using the private security information is sent over a secure channel that is not exposed to the user of the hardware device.

10. The computer-implemented method of claim 4, wherein public security information stored to the hardware device includes multiple decryption keys, the hardware device being capable of rotating a current key of the multiple decryption keys.

11. The computer-implemented method of claim 4, wherein the private security information is a private key and the public security information is a public key of an asymmetric keying process.

12. The computer-implemented method of claim 4, wherein the private security information includes a digital signature.

13. The computer-implemented method of claim 4, wherein the configuration information includes a firmware image and the first secure location on the hardware device is firmware.

14. The computer-implemented method of claim 4, wherein the public security information is supplied to multiple hardware devices on a common host machine.

15. A system for securing information in a hardware device, comprising:
   a processor; and
   a memory device including instructions that, when executed by the processor, cause the processor to:
   store public security information in a first secure location for the hardware device, the public security information including decryption or signature validation information, the private security information not being exposed to a user provisioned on the hardware device;
   store private security information in a second secure location external to the hardware device, the private security information including encryption or signing information;
   configure the hardware device to process an update request for configuration information on the hardware device that is secured using the private security information and is capable of being processed using the public security information stored on the hardware device, processing of the update request including decrypting the update request or validating a signature for the update request; and
   configure the hardware device to reject an update request that is not secured using the private security information,
   wherein the user provisioned on the hardware device is unable to update the configuration information.

16. The system of claim 15, wherein storing public security information in a first secure location on the hardware device includes writing the public security information to a chip on a motherboard, wherein the public security information is not modifiable, and wherein storing private security information in a second secure location external to the hardware device includes storing the private security information to a data store for a cloud manager system.

17. The system of claim 15, wherein the hardware device is a peripheral device or I/O controller on a host machine.

18. The system of claim 15, wherein the private security information is a private key and the public security information is a public key of an asymmetric keying process.

19. The system of claim 15, wherein the configuration information includes a firmware image and the first secure location on the hardware device is firmware.

20. A non-transitory computer readable storage medium storing instructions for securing information in a hardware device, the instructions when executed by a processor causing the processor to:
   store public security information in a first secure location for the hardware device, the public security information including decryption or signature validation information, the private security information not being exposed to a user provisioned on the hardware device;
   store private security information in a second secure location external to the hardware device, the private security information including encryption or signing information;
   configure the hardware device to process an update request for configuration information on the hardware device that is secured using the private security information and is capable of being processed using the public security information stored on the hardware device, processing of the update request including decrypting the update request or validating a signature for the update request; and configure the hardware device to reject an update request that is not secured using the encryption information, wherein the user provisioned on the hardware device is unable to update the configuration information.

21. The non-transitory computer readable storage medium of claim 20, wherein storing public security information in a first secure location on the hardware device includes writing the public security information to a chip on a motherboard, wherein the public security information is not modifiable, and wherein storing private security information in a second secure location external to the hardware device includes storing the private security information to a data store for a cloud manager system.

22. The non-transitory computer readable storage medium of claim 20, wherein the hardware device is a peripheral device or I/O controller on a host machine.

23. The non-transitory computer readable storage medium of claim 20, wherein the private security information is a private key and the public security information is a public key of an asymmetric keying process.

24. The non-transitory computer readable storage medium of claim 20, wherein the configuration information includes a firmware image and the first secure location on the hardware device is firmware.

* * * * *